Patented July 18, 1939

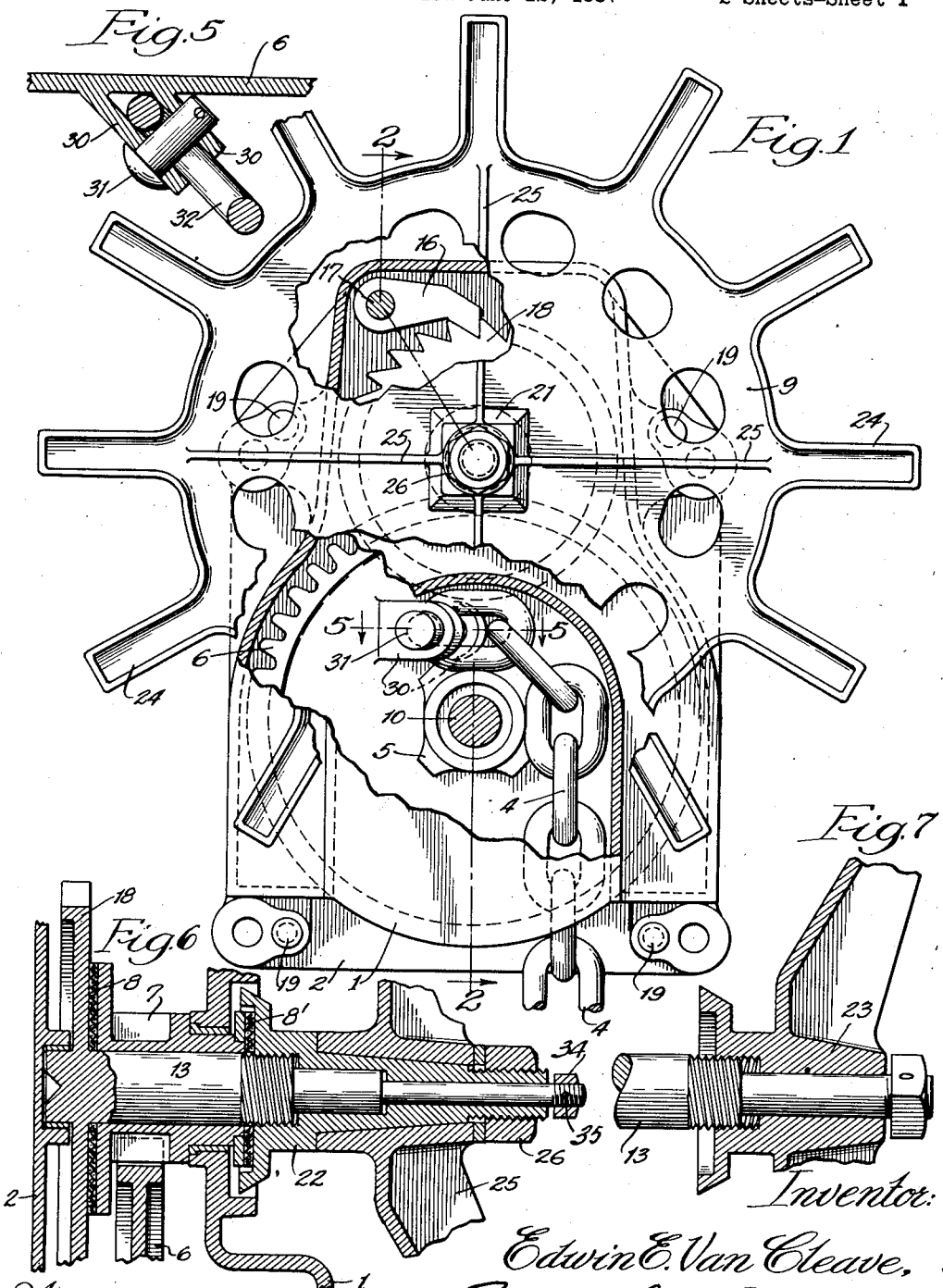

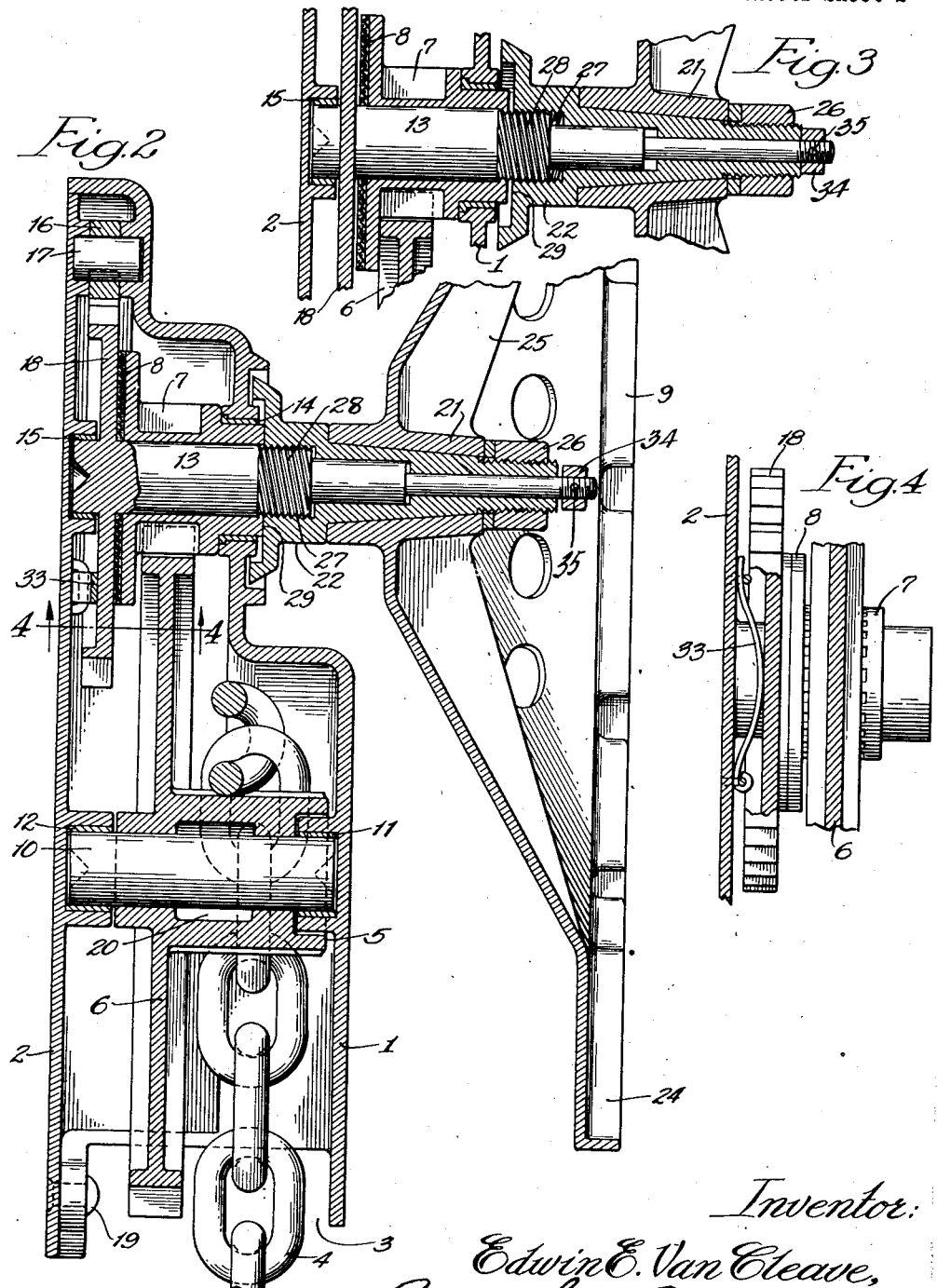

2,166,201

UNITED STATES PATENT OFFICE 2,166,201

NONSPIN WHEEL BRAKE

Edwin E. Van Cleave, Chicago, Ill.

Application June 12, 1937, Serial No. 147,827

8 Claims. (Cl. 74—505)

Hand-operated brake mechanisms of the class to which this invention relates were developed on account of objections to the fact that back-spin of hand wheels on releasing the conventional type of brake is a source of accident to the operators.

The purposes of this invention are, in addition to improvements in the construction of the nonspin type of mechanism, to combine therewith with safety the hand spoke type of wheel which allows a more comfortable position of the operator's hand and wrist than when gripping the rim of a handwheel; to include in the combination an inaccessible pawl and ratchet retaining means for the brake mechanism; a friction clutch arrangement for rendering the ratchet mechanism effective and ineffective to any desired holding degree by and according to the direction of rotation of the handwheel; to provide a clutch designed to allow a gradually slacking off so that about any degree of pressure may be held; to provide an arrangement which permits, within the standard dimensions of the housing, the use of an exceptionally large ratchet with substantial ratchet teeth and because of the diameter allowing for a reduction of holding pressure between the ratchet and pawl, and a holding engagement on every few degrees of rotation of the handwheel in the brake-applying direction; to provide improvements in a mounting and winding means for a chain; and to provide a housing or casing arrangement for brake-operating mechanism allowing for ease of assembly and a long-lived nonfreeze construction.

The objects of the invention are attained by means of the construction illustrated. The drawings show in—

Fig. 1 a face view of the construction with the casing partly broken away to show the attaching means for a chain and chain-sprocket.

Fig. 2 is a vertical section as indicated by the line 2—2 on Fig. 1.

Fig. 3 is a fragmentary sectional detail of the handwheel mounting, the same as in Fig. 2, but with the clutch disengaged.

Fig. 4 is a fragmentary detail on the line 4—4 of Fig. 2 showing a friction drag for a ratchet wheel.

Fig. 5 is a sectional detail as indicated by the line 5—5 of Fig. 1 showing how the end of the chain is anchored to the chain-winding gear.

Fig. 6 is a sectional detail similar to that shown by Fig. 3 but it includes a clutch facing omitted in Fig. 3.

Fig. 7 is a fragmentary detail showing in section the hub of a handwheel when the wheel hub is made special for this mechanism without the use of an adaptor for standard wheel hubs as shown in the remaining views.

The improved mechanism is designed for maximum simplicity and ruggedness, ease of manufacture and assembly, and to meet all specifications now made as to requirements for the dimensions, attachment, operation and construction of hand-wheel brake mechanism.

The principal features of the construction are a handwheel mounting having a threaded connection with the operating shaft and ratchet, whereby a few degrees of rotation of the wheel are utilized to gradually clutch or unclutch the wheel and the ratchet with the operated gearing; and incidentally to cause the ratchet either to hold or be disconnected from the brake mechanism in order to allow for a gradual or fast slacking off thereof with the wheel.

In the manufacture of this brake-operating unit, the housing and bearings are provided for by a two-piece construction comprising the castings 1 and 2. The casting 1 forms the front, top and side walls with an opening 3 at the bottom for passage of chain 4. The latter, at its lower end, is connected as usual with a brake rigging whereby brakes may be operated mechanically in addition to operation of the brakes through use of the air system.

The sprocket-toothed drum 5 upon which the chain is wound is integral with gear 6. The gear 6 meshes with pinion 7 which is rotated through a friction clutch disc 8 by hand-wheel 9.

Both the gear 6 and pinion 7 are loose on their supporting shafts.

The axle 10 for gear 6 is also free to turn in its bearings 11 and 12. Likewise shaft 13 loosely supporting pinion 7 is free to turn in its bearings 14 and 15. A similar mounting is provided for pawl 16 on the short shaft 17. This pawl coacts with a ratchet wheel 18 integral with shaft 13.

The bearings for the different shafts are in bosses in the housing members 1 and 2. Thus in assembling the construction, the shafts and parts supported thereby are first placed in housing member 1, then the back part 2 of the housing is dropped into place over the free ends of the shafts and is riveted to part 1 at points 19. The loose mounting of the shafts and parts supported thereon affords a double protection against what is termed "freezing", from rust during a long period of idle standing of the car.

The bearing elements 11, 12, 14 and 15 are of the lubricant impregnated type and greasing provision is made as in the pocket 20 in the hub of gear 6.

The wheel 9 has a square hub 21 of the dimensions standard for handwheels, as shown in Figs. 1 and 2, and to adapt the improved mechanism to this type of hub, an adapter element 22 is employed for connecting the wheel with the supporting shaft 13. In the variation shown in Fig. 7, hub 23 of the wheel is specially formed for direct support upon shaft 13. The wheel 9 differs from the customary handwheel design by the rim spokes 24 and these are permissible because of the non-spin arrangement of the wheel.

The wheel is also distinguishable from those generally used by its dish-form and radial webs 25.

The wheel is clamped to adapter 22 by nut 26 and the adapter is internally threaded at 27 to fit threads 28 on shaft 13. The wheel and adapter elements may rotate upon shaft 13 sufficiently to shift the shaft and ratchet wheel thereon to right or left of Fig. 2 into and out of engagement with the clutch surface 8 on pinion 7. By rotating the wheel in a right-hand (clockwise) direction, as is necessary for applying the brakes, shaft 13 and the ratchet wheel 18 are drawn to the right, Fig. 2, by the screw action. The adapter bears against surface 29 of the hub of pinion 7 and the ratchet wheel is clutched to the pinion at the clutch disc 8. The longitudinal motion of shaft 13 is limited by the clutch and further rotation of wheel 9 in a right-hand direction is transmitted by pinion 7 to the gear 6.

The gear 6 carries the drum or sprocket 5 for chain 4, the chain being anchored at its upper end to the face of gear 6. The gear is for this purpose provided with ears 30 for supporting a chain-receiving pin 31. The ears 30 stand at an angle to the face of gear 6 as shown in Fig. 5. Thus the end link 32 of the chain stands inclined at an angle to the axis of the sprocket. This inclined link guides the second convolution of the chain and permits slightly more than a complete winding revolution of the sprocket without having the chain rewind on itself. But generally one revolution or less is ample for full application of the brakes. As shown in Figure 1, the teeth and spaces of the sprocket fit and properly support all links and prevent twisting of the chain as it winds on the drum.

A spring drag 33, Fig. 4, bears against the side of ratchet wheel 18 to insure relative rotation between the wheel 9 and shaft 13 upon initial right hand motion of wheel 9 when the shaft and ratchet wheel are drawn to the right to engage clutch 8. The spring 33 also urges the ratchet wheel normally to the right, of Figure 2, to apply a modicum of pressure on the clutch at all times.

When the brakes are in released position, the clutch 8 is disengaged, as indicated to an exaggerated degree for clearness in Fig. 3. Then to apply the brakes, wheel 9 is rotated in a right-hand direction. The first action is that of shaft 13 and ratchet 18 shifting slightly to the right to the position indicated in Fig. 2, or in Fig. 6. In Fig. 6 the clutch disc 8 is supplemented by another clutch surface 8' at the opposite end of the pinion hub.

By the initial movement of wheel 9 the pinion 7 is tightly clamped between the ratchet 18 and the end of the adapter 22. Further rotation of the handwheel serves to turn both the ratchet 18 and the pinion 7.

Backward rotation of the ratchet is prevented by gravity-operated pawl 16 and however much the brakes may be taken up through motion transmitted from pinion 7 to the brake-operating chain 4, a slacking off is prevented by pawl 16 unless the operator provides for a slacking off of the brakes by imparting a few degrees of left-hand rotation to wheel 9.

Such slight reverse motion of wheel 9 is made use of for releasing the ratchet 18 from pinion 7 at the clutch 8, when the ratchet is shifted to the left because of the screw action between shaft 13 and the adapter 22 which is rigid with the wheel.

By permitting only a slight slip of the clutch, the pressure on the brakes is correspondingly decreased but by moving the wheel 9 to the left far enough to wholly disengage the hub of the pinion 7, the brakes may be entirely freed as rapidly as desired, while the wheel 9, shaft 13 and ratchet 18 remain stationary. The spring 33 acts to maintain a certain amount of resistance in the clutch even when released so that the release of the brakes will be controlled sufficiently to prevent injury to the air brake cylinders by too violent release. To this end the movement of pinion 7 toward the right of Fig. 2 is limited by the thrust resisting function of the bearing 14.

A nut 34 on the reduced and threaded end of shaft 13 serves as an adjustable limit stop for the unscrewing movement of the adapter 21. A cotter 35 secures the nut 34 against movement out of its adjusted position.

I claim:

1. In a railway brake winding mechanism, a supporting structure having bearings therein for a winding mechanism, a brake rigging control chain, winding mechanism for said chain supported in said bearings and including a ratchet wheel and shaft rigid therewith, a handwheel mounted on said shaft and having a threaded connection therewith whereby the wheel may be turned on the shaft, a pinion geared to said winding mechanism and loosely mounted on the shaft between the ratchet wheel and the hub of the handwheel and a friction element acting between said pinion and ratchet wheel to control the relative rotation thereof through the screw connection between said handwheel and shaft.

2. In a brake-operating mechanism of the class described, a frame structure providing bearings for brake-operating mechanism, brake-operating mechanism supported in said bearings and including a gear wheel and chain sprocket drum, said gear wheel having a chain-anchoring means projecting at an inclination from its face, and a chain having links meshing with the teeth on said sprocket and having an end link disposed at an angle to the sprocket and secured to said anchoring means.

3. A brake-operating mechanism of the class described comprising a supporting structure provided with bearings for brake-operating mechanism, brake-operating mechanism supported in said bearings and including a rigid ratchet wheel and shaft, a handwheel concentric with the shaft, and having a square axial socket, an adapter for connecting the handwheel with the shaft, said adapter fitting said socket and being provided with an internal thread, said shaft having an external thread for engagement with the thread of the adapter, and a brake-operating pinion supported on said shaft between the ratchet and the adapter whereby when the handwheel and the adapter are turned on the threaded connection with the shaft the pinion is gripped between the ratchet wheel and the adapter.

4. A railway brake-operating mechanism comprising a supporting structure having a winding brake take-up mechanism mounted therein, an operating shaft for driving said take-up mechanism having a thread thereon and having an end of circular cross section projecting from said structure, a hand-wheel having a hub with a bore shaped for non-rotating application of the wheel to a shaft of non-circular cross section, an adapter element formed to fit the bore of the wheel hub, having a central bore formed for fitting the end of the said operating shaft and a threaded portion fitting the thread on said shaft, said mechanism including a ratchet wheel fast on said shaft, a pinion loose on said shaft, and a friction element controlled by the threaded connection between said shaft and adapter for controlling the relative rotation of said pinion and shaft.

5. A railway brake-operating mechanism, comprising a support, a winding drum, a gear fast on said drum, a driving pinion for said gear, an operating shaft on which said pinion is loosely mounted, a ratchet wheel fast on said operating shaft, a handwheel on said operating shaft having helical connection therewith for limited longitudinal movement of the handwheel thereon through relative rotation of said handwheel and operating shaft, a friction clutch element acting between said pinion and ratchet wheel and controlled by longitudinal movement of the handwheel to control the relative rotation of said rachet wheel and pinion, and means normally acting to impose a modicum of resistance to rotation of said pinion when said clutch is released by said handwheel.

6. A railway brake-operating mechanism, comprising a support, a winding drum, a gear fast on said drum, a driving pinion for said gear, an operating shaft on which said pinion is loosely mounted, a ratchet wheel fast on said operating shaft, a handwheel on said operating shaft having helical connection therewith for limited longitudinal movement of the handwheel thereon through relative rotation of said handwheel and operating shaft, opposed friction clutch surfaces on said ratchet wheel and pinion, a clutch lining interposed between said surfaces, a drag spring normally urging said friction clutch surfaces into gripping engagement with said lining, and said handwheel being arranged to force said clutch surfaces together and apart through its spiral connection with said shaft.

7. In a railway brake operating mechanism, a brake rigging control chain, a winding drum comprising a cylindrical body having axially disposed alternate ribs and grooves in its periphery to fit said chain, a gear fixed to said drum and having chain anchoring lugs inclined to the plane of rotation of said drum and so spaced from said drum as to guide the chain diagonally across the periphery of the drum with alternate links of the chain seated in said grooves.

8. In a railway brake winding mechanism, a supporting structure having bearings therein for a winding mechanism, a brake rigging control chain, winding mechanism for said chain supported in said bearings and including a ratchet wheel and shaft rotatable therewith, a hand wheel mounted on said shaft and having a threaded connection therewith whereby the wheel may be turned on the shaft, a pinion geared to said winding mechanism and loosely mounted on the shaft, and a friction element acting between said pinion and ratchet wheel to control the relative rotation thereof through the screw connection between said hand wheel and shaft.

EDWIN E. VAN CLEAVE.